United States Patent [19]

Peden et al.

[11] 4,141,564
[45] Feb. 27, 1979

[54] POWER OPERATED CHUCK

[76] Inventors: John R. Peden, Liphill Quay, Bere Ferrers, Devon, England; Derek V. I. Santillo, 66 Elm Rd., Mannamead, Plymouth PL4 7BB Devon, England

[21] Appl. No.: 785,148

[22] Filed: Apr. 6, 1977

Related U.S. Application Data

[63] Continuation-in-part of Ser. No. 565,318, Apr. 4, 1975, Pat. No. 4,032,161.

[51] Int. Cl.$^2$ .......................... B23B 5/22; B23B 5/34; B23B 31/30
[52] U.S. Cl. ........................................ 279/4; 279/1 H
[58] Field of Search .................. 279/4, 1 H, 118, 121; 60/DIG. 10, 52VS, 491, 492; 91/476

[56] References Cited

U.S. PATENT DOCUMENTS

| | | | |
|---|---|---|---|
| 3,926,446 | 12/1975 | Rohm | 279/4 |
| 3,972,537 | 8/1976 | McClelland | 279/4 |

*Primary Examiner*—Travis S. McGehee
*Attorney, Agent, or Firm*—Sughrue, Rothwell, Mion, Zinn and Macpeak

[57] ABSTRACT

A power operated chuck in which an actuator, such as a fluid pressure actuator, causes clamping or unclamping movement of the jaws in dependence on the position of a control member, in which the power for operation of the actuator is derived from rotation of the chuck or one of two chuck body parts on a shaft of a machine tool, the power source being housed within the chuck which is thus self contained and does not require a separate power source. The power source is in the form of a plurality of fluid pressure pumps worked by a swash plate carried by the rotating chuck or a rotating chuck body part. Fluid pressure built up by the pumps is stored in a fluid pressure reservoir and used to drive the actuator. As fluid pressure is built up the swash plate is displaced to a position where, when maximum pressure has been generated, it lies perpendicular to the axis of rotation of the chuck or the rotatable chuck body part so that no further pressure is generated as the chuck continues to rotate.

10 Claims, 7 Drawing Figures

POWER OPERATED CHUCK

This application is a continuation-in-part of application Ser. No. 565,318, filed Apr. 4, 1975 now U.S. Pat. No. 4,032,161.

BACKGROUND OF THE INVENTION

The present invention relates to a work holding chuck for a machine tool such as a lathe, capstan lathe milling machine or the like. In particular, the present invention relates to a power operated chuck capable of clamping to hold a workpiece, or unclamping to release a workpiece, in a single, power driven stroke which can be controlled by displacement of a control member.

Conventional power chucks are either pneumatically or hydraulically operated and they rely for their power on power supplies separate from the driving motor of the machine tool; this represents a considerable disadvantage not only because of the expense of the chuck and its operating and control mechanism, but also because of the difficulty of mounting and setting up the chuck and its operating and control mechanism for proper operation.

The power source for known pneumatically operated chucks is normally an air compressor which operates to provide a supply of compressed air, via a control valve or a plurality of control valves, to energise at least one pneumatic actuator which acts, via a suitable linkage, on a draw bar or tube which passes through a hollow spindle of the machine. The draw bar or tube links the actuator to the operating mechanism of a chuck the jaws of which are caused to open or close by the action of the actuator on the draw bar or tube. Known hydraulic chucks operate in a similar manner. One of the disadvantages encountered with such known power operated chucks is that of transmitting the power to close or open the jaws when controlled to do so while nevertheless allowing the chuck to rotate with the jaws clamped, at perhaps a very high speed. In some known hydraulically operated chucks there are various mechanical parts linked to an hydraulic actuator mounted at the spindle end of the machine with a chuck being attached to the spindle via an hydraulic actuator. Even in this case, however, the source of hydraulic pressure must be separate from the machine.

Since the attachment, assembly and setting up of these known types of power chucks takes considerable time and labour they become effectively a part of the machine tool once fitted; although they are nominally interchangeable it has been found, in practice, that it is not worth doing so due to the amount of down time and labour involved.

OBJECTS OF THE INVENTION

One object of the present invention is to provide a power operated chuck which does not suffer from the above mentioned disadvantages of conventional separately driven power chucks, or of the known types of self contained power chucks described above.

Another object of the present invention is to provide a chuck which is readily interchangeable either with other power operated chucks of the same type, or with manually operated chucks so that different sizes of work may readily be accommodated on a single machine by interchanging chucks of different size.

A further object of the invention is to provide a power operated chuck which is robust, and which does not require a power supply separate from the motor driving the main spindle of the machine tool to which it is fitted.

SUMMARY OF THE INVENTION

According to one aspect of the present invention there is provided a power operated work holding chuck of the type having: a chuck body, radially movable jaws on the chuck body, fluid pressure operated actuator means, means linking said pressure operated actuator means to said jaws on said chuck body, whereby to transmit movement of said fluid pressure operated actuator means to said jaws, the improvement wherein: said chuck body is formed in two parts which are secured together and rotatable with respect to one another, one of said chuck body parts housing said fluid pressure operated actuator means, means for mounting said one of said chuck body parts on a spindle of a machine tool, means defining fluid pressure reservoir in said one of said two chuck body parts, a power source comprising means within said two chuck body parts for generating, as said two chuck body parts rotate with respect to one another, fluid pressure for driving said fluid pressure operated actuator means, said power source acting to pump fluid from one said reservoir to the other, said fluid pressure generating means comprising a plurality of pumps operated by relative rotation of said two relatively rotatable parts of said chuck, said plurality of pumps being mounted in a circle on said one of said two chuck body parts and having operating plungers associated therewith extending axially of the chuck body, a swash plate carried by said one of said two chuck body parts in engagement with the free ends of said plungers of said pumps, and resilient biasing means on said other of said two chuck body parts, in engagement with said swash plate and resiliently biasing it to a position inclined with respect to the plane defined by the free ends of said plungers of said pumps when they are not depressed.

By generating fluid pressure as a result of rotation of the chuck it is possible to dispense with the complicated and expensive separate power source and power feeding transmissions for transferring the power from the source to the chuck itself. This allows the chuck to be constructed integrally as a self contained unit and this in turn permits the ready interchangeability mentioned above.

Derivation of power from the rotation of the chuck when mounted on a spindle of a machine tool requires the cooperation of a suitable fixed part of the machine tool. If no such suitable fixed part is available, such may be provided for attachment to the machine tool when a chuck formed as an embodiment of the invention is initially fitted. Thereafter, the same cooperating part may serve for any chuck which is interchanged with the one initially fitted, for the same purpose.

Further features and advantages of the invention will become more apparent from a study of the following description of the invention, which is provided purely by way of non-restrictive example, and in which reference is made to the accompanying drawings.

DESCRIPTION OF THE PREFERRED EMBODIMENTS

Figure 1:
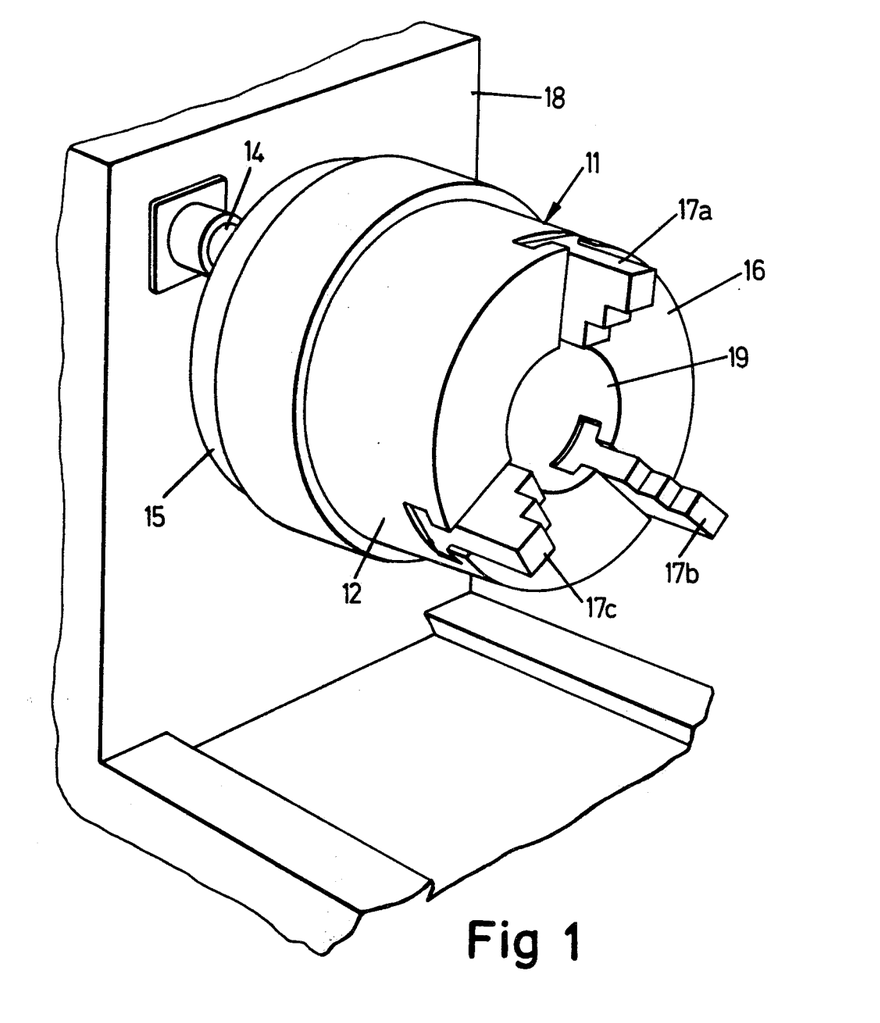
FIG. 1 is a perspective view of a chuck formed as a first embodiment of the present invention, showing it in place on a machine tool.

Referring now to the drawings, and in particular to FIG. 1 there is shown a chuck, generally indicated 11 comprising a substantially cyclindrical body 12 at the front face 16 of which there are carried three jaws 17a, 17b, 17c which are radially movable with respect to the axis of rotation of the chuck body 12 in the manner of a normal work holding chuck. The jaws 17 are housed in slots 20 (better seen from FIG. 3) and, in operation of the chuck, make limited radial movements either radially inwardly or radially outwardly depending on the control movement of the chuck.

Extending around the chuck body, spaced some distance from the front face 16, there is a control ring 13 which, in operation of the chuck, is used to control the opening or closing of the jaws 17: turning the control ring 13 in one direction to one angular end position with respect to the chuck body causes a powered clamping stroke, and turning the control ring 13 in the opposite direction to an opposite angular end position causes a powered opening stroke. Since the movement of the jaws 17 in both radially inward and radially outward directions is effected under a power stroke the chuck may be used for gripping either the outside of bar stock or the inside of tubular stock should this be desired.

Carried on a mounting part 18 of the machine is a cooperating projection 14 which extends towards a rear face 15 of the chuck body to cooperate with a swash plate 24 (see FIG. 2) in order to generate the pressure for operation of the chuck.

Figure 2:
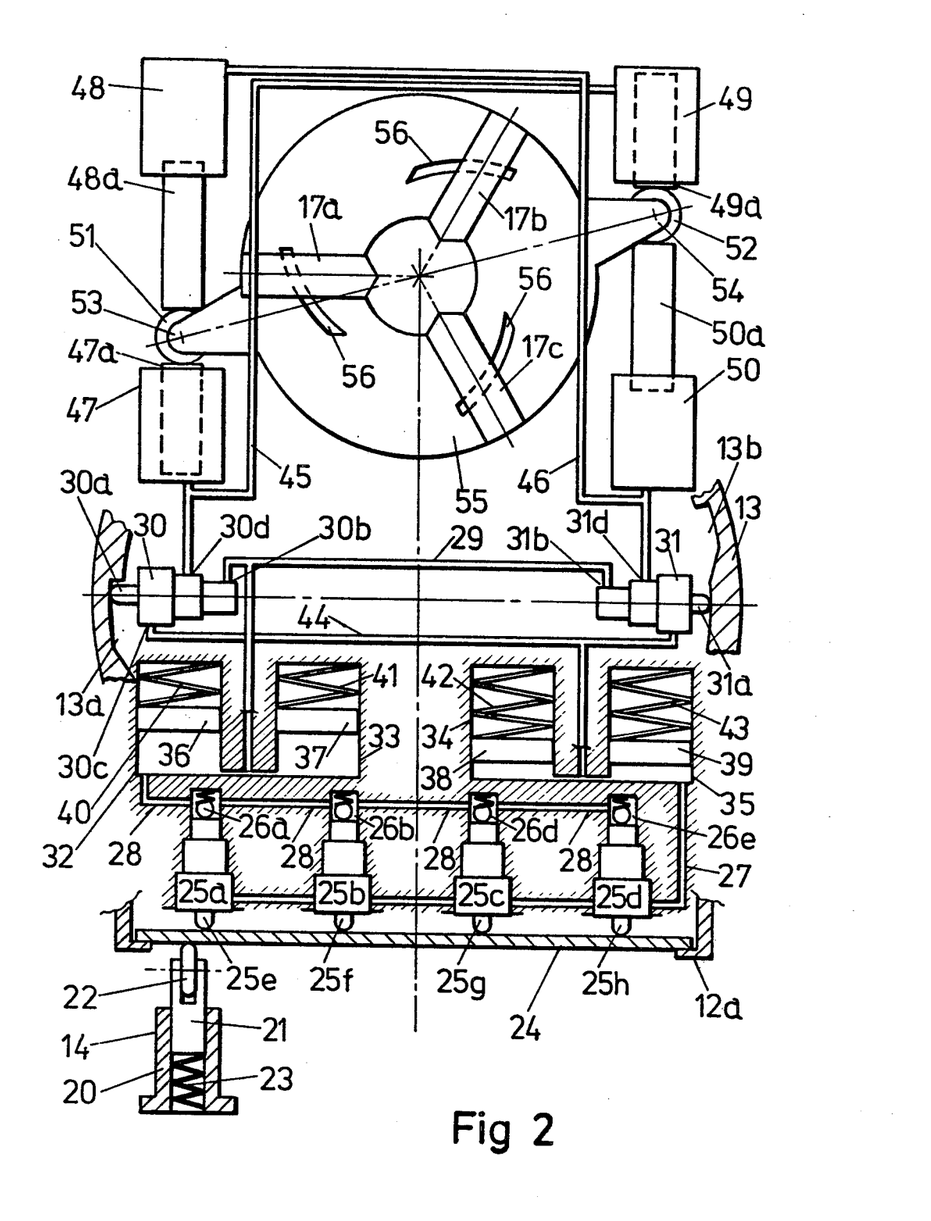
FIG. 2 is a schematic diagram illustrating the hydraulic circuit of the first embodiment.

Referring particularly to FIG. 2 it will be seen that the projection 14 comprises a cylindrical mounting sleeve 20 within which slides a plunger 21 resiliently biased by a spring 23 toward the rear face of the chuck body 12 and carrying at the outer end thereof a roller 22 which rolls over the swash plate 24 located within an inwardly directed flange 12a of the chuck body 12.

The swash plate 24 is urged toward the rear flange 12a by the action of plunger arms 25e, 25f, 25g, 25h of respective fluid pumps 25a, 25b, 25c, 25d which, although shown in line in FIG. 2, are in practice equally spaced in a circle around the axis of the chuck body 12. The pumps 25a, 25b, 25c 25d have respective outlet valves 26a, 26b, 26c, 26d joined by a common high pressure line 28 to two high pressure reservoirs which are formed as two cylinders 32, 33 housing respective pistons 36, 37 biased by respective springs 40, 41. The reservoirs 32, 33 are connected by a line 29 to two valves 30, 31 which are housed within the chuck body 12 and have respective actuating plungers 30a, 31a which extend radially outwardly and are positioned for radial movement.

The plungers 30a and 31a engage the inside face of the control ring 13 which is formed with two cam faces defined by notches 13a and 13b which are so positioned that the valves 30 and 31 are moved in opposition with respect to one another, with a slight phase displacement, when the control ring 30 is turned between angular end positions. The line 29 is connected to the valves 30, 31 by respective ports 30b, 31b which will be termed hereinafter the high pressure or inlet ports of the valves 30, 31 which also have respective outlet or low pressure ports 30c, 31c connected together by a low pressure line 44 which communicates with two low pressure reservoirs constituted by cylinders 34, 35 having respective pistons 38, 39 biased by respective springs 42, 43. The low pressure reservoirs 34, 35 are connected by a return line 27 to the low pressure inlet ends of the pumps 25 to complete the circuit.

The valves 30, 31 also have a further port 30d, 31d respectively which will be referred to hereinafter as the controlled port. The valves 30, 31 operate to connect either the high pressure ports 30b, 31b to the control ports 30d, 31d respectively or, alternatively, to connect the controlled ports 30d, 31d to the outlet or low pressure ports 30c, 31c respectively. Each valve 30, 31 also has an intermediate position where all ports are closed. The controlled port 30d of the valve 30 is connected by a line 45 to an hydraulic actuator 47 and to an hydrualic actuator 48, and the controlled port 31d of the valve 31 is connected by a line 46 to an hydraulic actuator 50 and to an hydraulic actuator 48. The actuators 47 and 48 have respective actuating plungers 47a, 48a and are arranged in opposition with a roller 51 trapped between the two plungers. Similarly, the actuators 50 and 49 have respective actuating plungers 50a and 49a and are positioned in opposition with a roller 52 between them. The rollers 51, 52 are carried on respective radial arms 53, 54 of a control disc 55 which is housed within the chuck body 12 for relative rotation with respect thereto whereas the actuators 47, 48, 49 and 50 are fixedly housed on the chuck body 12.

The valves 30, 31 and the cam faces formed by the notches 13a, 13b of the control ring 13 are so positioned that when, as shown in FIG. 2, the valve plunger 30a is extended, and the valve plunger 31a is depressed, the valve 30 connects the high pressure port 30b with the control port 30d so that the high pressure reservoirs 32, 33 communicate via the lines 29 and 45 with the actuators 47 and 49. At the same time the valve 31 is positioned such that the control port 31d communicates with the low pressure port 31c so that the actuators 50 and 48 communicate via the lines 46 and 44 with the low pressure reservoirs 34 and 35. In this position, therefore, the actuators 47, 49 will be driven to extend, turning the plate 55 in a clockwise direction (as viewed in FIG. 2), and the actuators 48 and 50 will permit this movement by virtue of the fact that fluid contained therein can flow through the lines 46, the valve 31, and the lines 44, to the low pressure reservoirs 34 and 35.

The disc 55 carries three inclined slots 56 which engage with correspondingly inclined projections or ridges (not shown) on the rear faces of the jaws 17, which latter are constrained to move radially inwardly or outwardly by their engagement with the chuck body 12. Rotation of the disc 55 in a clockwise direction will therefore cause the jaws 17 to move radially inwardly by virtue of the engagement of the slots 56 with the projections or ridges (not shown) in the rear face of the jaws 17. It will be appreciated that any suitable alternative engagement between the disc 55 and the jaws 17 could be utilised, in particular a known form of continuous spiral or scroll groove in the disc 55 with a plurality of cooperating teeth in the rear face of the jaws 17 may be used.

Following the closure of the jaws 17 upon extension of the actuators 47 and 49 the system will reach a terminal position with the actuators 47 and 49 fully extended and the actuators 48 and 50 fully retracted. Assuming that a workpiece has been satisfactorily clamped within the jaws 17 the spindle on which the chuck is mounted would then be rotated in order to effect the desired operations on the workpiece and this causes the swashplate 24 housed in the chuck body 12 to rotate with respect to the fixed projection 14, the roller 22 rolling over the rear face of the swashplate 24.

The spring 23 in the cylinder 20 of the projection 14 is stronger than the springs of the pumps 25 and thus the spring 23 will be partly extended causing each plunger 25e, 25f, 25g, 25h to be depressed once per revolution of the chuck as it passes the contact point with the roller 22 of the projection 14. This causes the pumps to operate to draw fluid from the low pressure reservoirs 34, 35 and to pass it to the high pressure reservoirs 32, 33. When this reaches a predetermined pressure, determined by the strength of the spring 23, the back pressure on the ball valves 26 at the outlet of the pumps 25 will cause these to remain closed so that the swashplate 24 is held in a position perpendicular to the axis of rotation of the chuck body 12 with the roller 22 running smoothly over it. This condition represents a fully charged condition of the chuck ready for subsequent opening or closing operations. Continued rotation of the chuck body 12 will not result in over-pressure being generated since, when the swash plate 24 is in the perpendicular position described above the pumps 26 are not operated as they pass the position of the projection 14 so that no over-pressure relief valve or the like is required. The mechanism reaches, effectively, a balanced condition when fully charged. This balanced condition can be varied by making the spring 23 in the cylinder 20 adjustable, for example by means of a screw threaded adjuster locating the end of the spring 23 remote from the plunger 21.

When the chuck is stationary and it is desired to move the jaws 17 the control ring 13 is merely moved to the other end of its range of travel and fluid pressure from the reservoirs 32 and 33 will be transferred through the valves 30 and 31 and the actuators 47–50 to the low pressure reservoirs 34, 35 causing a partial rotation of the disc 55 in so doing. This, in turn, causes the desired radial movement of the jaws 17. The reservoirs 32, 33 should be made sufficiently large to house enough fluid pressure for several adjusting movements, opening and closing the jaws 17, in order to ensure that the chuck will remain operative even if the workpiece is not properly positioned after two or three attempts. Even though utilising the mechanism several times will cause the pressure in the reservoirs 32, 33 to decrease, and therefore cause a corresponding reduction in the force with which the jaws 17 grip the workpiece, the pressure within the reservoirs 32, 33 is restored after several rotations when it again reaches the fully charged or balanced position referred to above, so that a full clamping force is applied by the chuck before any force is applied to the workpiece by the operating tool.

The weakest pressure applied by the chuck, when the pressures in the reservoirs 32, 33 and the reservoirs 34, 35 are very nearly the same, will be determined by the strength of the biasing springs 40, 41, 42, 43. The strength of these springs must, in turn, be balanced with the strength of the spring 23 in order to determine the maximum clamping force since the relative strengths of these springs determines the pressure within the high pressure reservoirs 32, 33 when they are fully charged. It is envisaged that an adjusting arrangement for the springs 23 and 40–43 would be provided to adjust the clamping force to suit different workpieces. For example, if a relatively delicate workpiece such as a thin walled tube was to be clamped by the chuck it would be necessary to reduce the strength of the springs 40–43, and correspondingly the spring 23, in order to ensure that the maximum pressure within the high pressure reservoirs 32, 33 was not so great as to apply a force to the jaws 17 to deform the walls of the workpiece.

Figure 3:
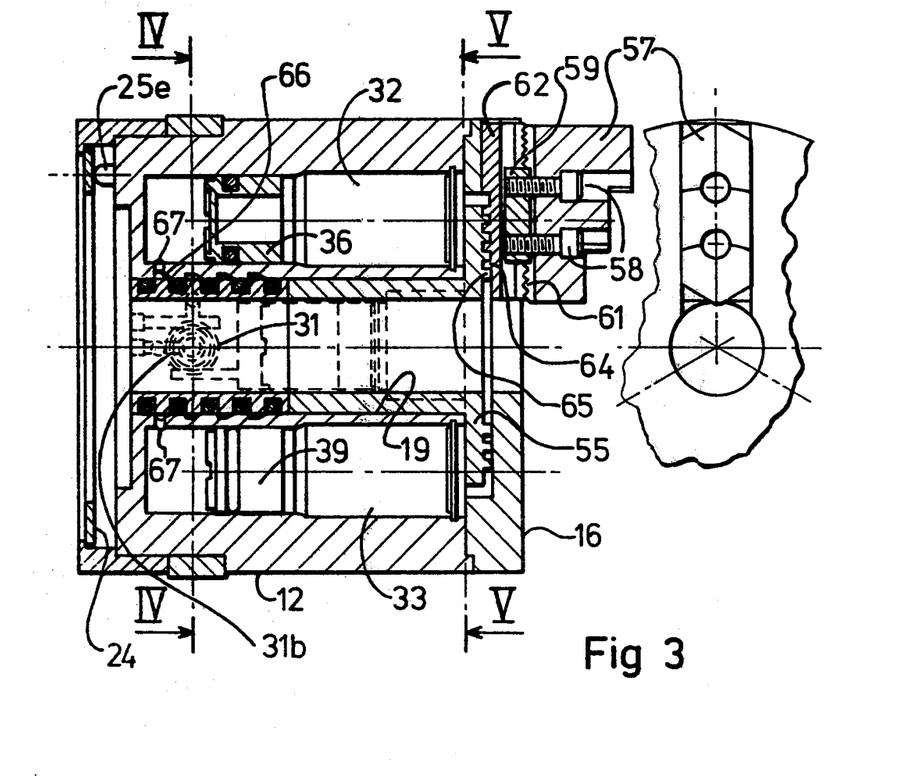
FIG. 3 is an axial section of the first embodiment, taken on the line II—II of FIG. 4.
Figure 4:
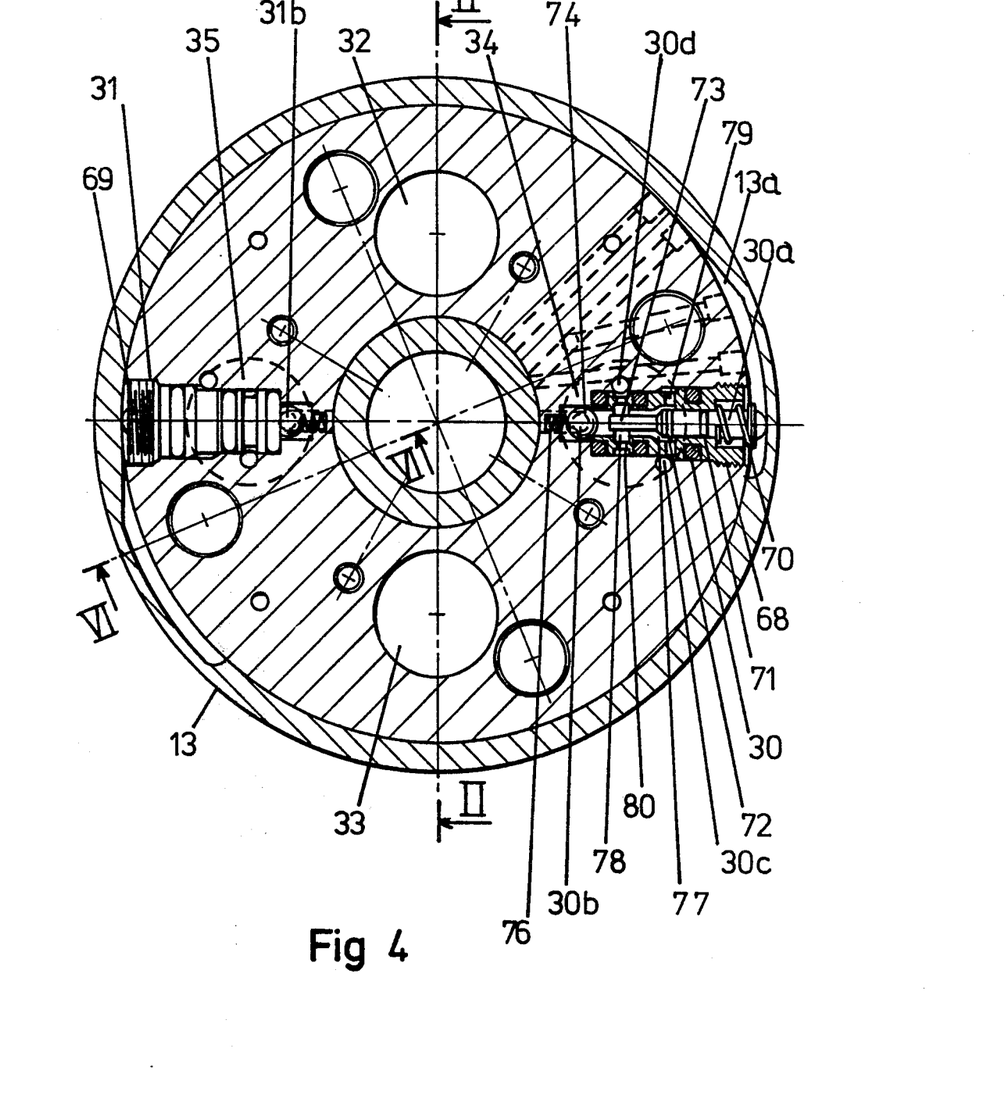
FIG. 4 is a cross section on the line IV—IV of FIG. 3.
Figure 5:
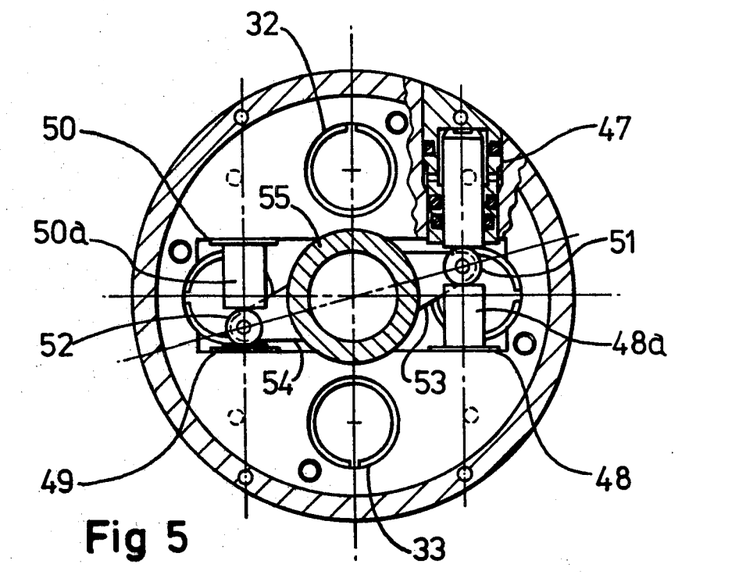
FIG. 5 is a cross section on the line V—V of FIG. 3.
Figure 6:
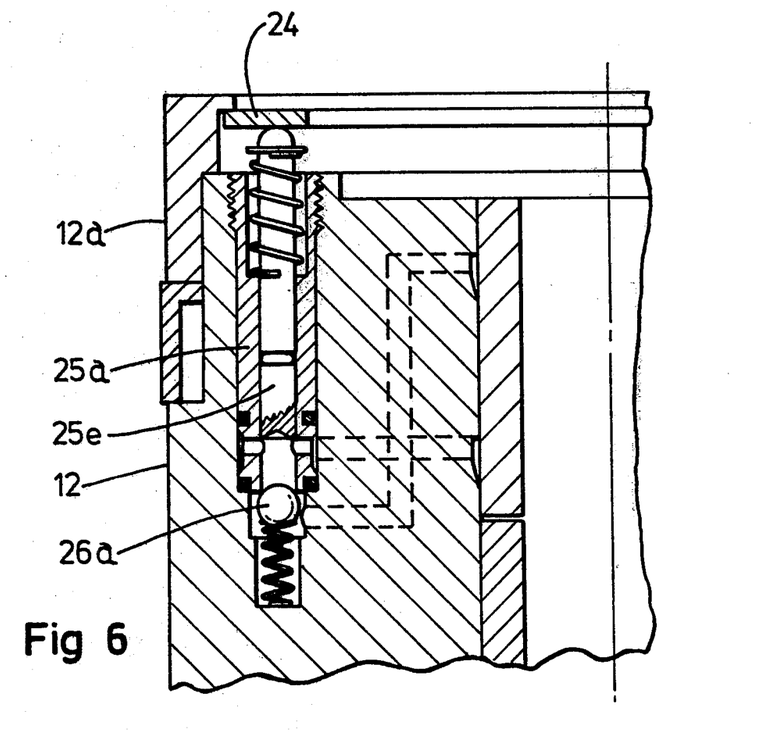
FIG. 6 is a partial section on the line VI—VI of FIG. 4.

Referring now to FIGS. 3 to 5, the practical embodiment is shown in greater detail. In this embodiment the chuck body 12 is formed with a plurality of drillings which form the cylinders for the actuators 47–50 and for the reservoirs 32–35. Similarly, two radial stepped bores are provided in the body to act as housings for the valves 30, 31 and the pumps 25 are housed in axial bores in the body 12.

The jaws 17 located on the front face 16 of the chuck body 12 are formed, in a known way, comprising a main jaw body 57 having three shouldered steps and secured by screws 58 to a rear jaw body 59 which is T-shaped in cross section and housed in a T-section slot in a carrier 62 mounted in the chuck body 12 and constrained to move radially along a slot 63 within which it is housed. The rear face of the main jaw body 57 has a plurality of serrations 61 which correspond with serrations on the front face of the carrier 62 whereby the main jaw body 57 can be adjusted radially with respect to the carrier 62 by slackening the screws 58 and sliding the main jaw body 57, together with the rear jaw body 59 along the slot in the carrier 62, retightening the screws 58 to clamp the parts of the jaw together in the selected position. The carrier 62 has a plurality of rectangular teeth 64 which cooperate with a scroll 65 on the front face of the disc 55, and which corresponds to the arcuate slots 56 described with reference to FIG. 2. Angular movement of the disc 55 about the axis of the chuck body therefore causes radial movement of the jaws 57 as these are constrained to move radially within the slot 63.

The reservoirs 32–35 are formed as drillings axially of the body 12 and are located, as will be seen from FIG. 4, in pairs diametrically opposed and in quadrature with respect to one another. The low pressure reservoirs 34, 35 are somewhat shorter than the high pressure reservoirs 32, 33 so that the two valves 30, 31 can be located circumferentially in correspondence with the ends of the low pressure reservoirs 34, 35 and between the ends of the high pressure reservoirs 32, 33. Intercommunication between the reservoirs, the valves and the pumps is formed by suitable drillings in the body 12, and also by means of a distributor sleeve which cooperates with a plurality of annular grooves formed in the inner curved surface of the central bore 19 in the chuck body 12. In FIG. 3 there can be seen a radial drilling 67 which corresponds to the high pressure line 28 and 29 of FIG. 2, interconnecting the two high pressure reservoirs 32, 33 and the outlets of the pumps 25. An annular groove 66 in the bore 19 of the chuck body 12 communicates with the radial bore 67 and with an axial bore communicating with the high pressure ports 30b, 31b of the valves 30, 31.

The valves 30 and 31 are formed as radial drillings in the body 12 which house stepped valve bodies 68, 69, respectively. Within the body 68 of the valve body 30 there is a valve plunger 30a which is a spring biased radially outwardly by a spring 70 and carries two sealing rings 71, 72 spaced along its length. At the radially inner end of the plunger 30a there is a spigot 73 which cooperates with a ball 74 which is biased by a spring 76 into engagement with the opening of the high pressure port 30b to close this in reinforcement with the action of the high pressure fluid.

The bore in the valve body 68 within which the valve plunger 30a slides has two annular grooves 77, 78 machined therein, and these grooves communicate via respective radial drillings 79, 80 with the low pressure ports 30c and the controlled ports 30d respectively. In the position of the valve shown in FIG. 4, the plunger 30a is fully extended into the recess 13a of the control ring 13, the ball 74 is biased to close the high pressure port 30b, and the control port 30d communicates with the low pressure port 30c via the valve chamber formed by the bore within the valve body 68. In this position, therefore, the actuators 47 and 49 are connected to the low pressure reservoirs 34 and 35 and the chuck will be in the open position as illustrated in FIG. 2. If the control ring 13 is then turned clockwise (as seen in FIG. 4) the cam face within the recess 13a engages the radially outer end of the plunger 30a and causes this to travel radially inwards. As the plunger 30a moves inwards the sealing ring 72 first engages an intermediate part of the valve chamber 80 closing the communication between the port 30c and 30d. On further movement of the plunger 30a the spigot 73 at the radially inner end thereof engages the ball 74, which closes the high pressure port 30b, and lifts this from its seat permitting communication between the high pressure port 30b and the controlled port 30d. The high pressure reservoirs 32, 33 are now in communication with the actuators 47 and 49 via the valve 30. As the control ring 13 is moved to depress the plunger 30a a corresponding release of the plunger 31a of the valve 31 will commute the valve 31 so that the controlled port 31d thereof is placed in communication with the low pressure port 31c while the high pressure port 31b is first allowed to close. The actuators 47 and 49 are thus extended while the actuators 48 and 50 are permitted to retract. This causes a rotation of the disc 55 and thus closure of the jaws 17. Turning the control ring 13 in the counter-clockwise direction resets the valves 30 and 31 to the position shown in FIG. 4 connecting the circuit for extension of the actuators 48 and 50 and retraction of the actuators 47 and 49 to return to the jaw open position illustrated in FIG. 2.

It is envisaged that an interlock system will be provided to prevent opening of the jaws while the chuck is turning, and to prevent starting of the machine tool motor while the jaws are open. Such an interlock may be formed electrically by means of a microswitch in circuit with the machine tool motor and mechanically linked, for example, to the valve plungers 30a, 31a so that, for clamping in one direction the switch associated with the plunger 30a would be operative while for clamping in the opposite direction the switch associated with the plunger 31a would be operative. Alternatively, for fully automatic operation of the chuck, there may be provided an associated actuating mechanism for mounting on the machine tool and for engagement with the control ring 13 which operates to turn the control ring in order to open or close the jaws of the chuck without requiring manual intervention. Such an operating mechanism could, of course, be associated with electrical switches which isolate the motor when the chuck jaws are opened.

It will be appreciated, from a review of FIGS. 3 to 5 of the drawings, that in this embodiment the operating parts of the chuck are housed in an annular arrangement surrounding the central bore 19 of the chuck body so that for long bar work a hollow spindle machine tool may be used and the bore of the spindle will be entirely unobstructed by the chuck. Similarly, the chuck may be mounted to the machine spindle in exactly the same way as a conventional manually operated chuck so that embodiments of the present invention offer all the advantages of interchangeability and versatility of conventional manually operated chucks while also having the advantage of speed and ease of operation of power chucks.

Moreover, because of the design of the chuck incorporating all the reservoirs, valves and pumps in bores in a single body, embodiments of the present invention may be manufactured considerably more cheaply than has hitherto been possible for power operated chucks.

Figure 7:
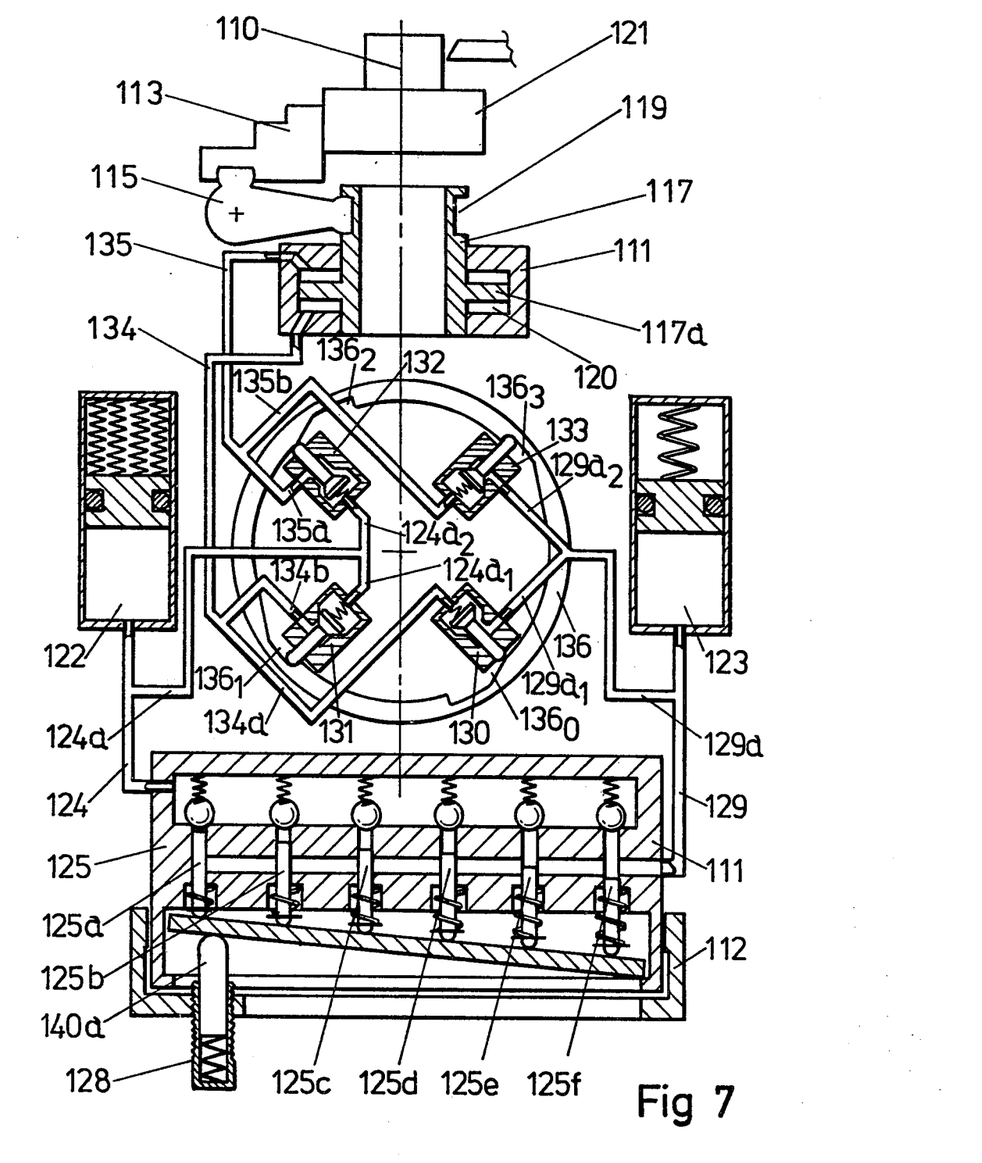
FIG. 7 is a schematic diagram illustrating the construction of a second embodiment of the invention.

Referring now to FIG. 7 there is shown, schematically, a second embodiment of the invention, in which the chuck body is formed in two parts 111 and 112 which are connected together using known means (not shown) such as, for example, a roller bearing, which permit the two chuck body parts 111 and 112 to rotate with respect to one another about a main axis of rotation indicated generally 110 in FIG. 7. When the chuck is mounted on a machine tool the chuck body part 111 is secured to the spindle of the machine tool in a known way, for example by means of three axial pins (not shown), and the other chuck body part 112 is located against a fixed abutment on the machine tool so that the rotatable chuck body part 111 can rotate with respect thereto.

In the schematic diagram of FIG. 7 the chuck body part 111 is shown in two parts for convenience. The chuck has radially movable jaws 113 which are housed in slots (not shown) in the front face of the chuck body part 111. In the rear face of the jaws 113 are formed recesses engaged by one arm of a respective bellcrank lever 115 the other arm of which engages in an annular recess 119 in an actuator tube 117 housed in a bore in the chuck body part 111.

Opening and closing movements of the jaws 113 are effected by axial movement of the actuator tube 117 to cause rotation of the levers 115 in a known way. The actuator tube 117 has a radial flange 117a adjacent the end remote from the recess 119 and this flange is housed sealingly within a first annular recess 120 in the bore in the chuck body part 111 to act as a piston, separating the recess 120 into two chambers which can respectively be fed with high and low pressure from a pressure source to cause axial movement of the actuator tube 117 in one direction or the other.

The pressure source of the chuck feeds a reservoir 122 and comprises an array of fluid pumps 125 which are automatically actuated by rotation of the chuck part 111 with respect to the chuck body part 112, when mounted on a machine tool spindle. There are six pumps 125a, 125b, 125c, 125d, 125e, 125f in the array of pumps 125, arranged in a circle around the chuck body part 111.

Basically, as schematically shown in FIG. 7, each pump comprises a plunger sliding in a bore at one end of which is a unidirectional valve. The bores along which the plungers of the pumps 125a–125f slide are connected together by a conduit 129 leading to a low pressure reservoir 123, and the action of the pumps as the plungers are reciprocated along their bores is to draw fluid from the low pressure reservoir 123 and to pump it under pressure via a conduit 124 to high pressure reservoir 122. Sequential actuation of the plungers of the pumps 125a–125f is effected by means of a swash plate 126 which is mounted on the rotatable chuck body part 111 and cooperates with a spring loaded hardened steel pin 140a carried by the other chuck body part 112 which is held against rotation as the array of pumps 125 is rotated with the chuck body part 111. The swash plate 126 is held under a flange 111a of the rotatable chuck body part 111 and its inclination to the axis of rotation of the chuck body 111 can be adjusted by adjusting the projection of the spring loaded pin by means of the screw threaded carrier 128, this thus determines the length of stroke of each plunger of the pumps 125.

The high pressure reservoir 122 fed by the pump array 125 is connected by a conduit 124a and two branch conduits 124$a_1$ and 124$a_2$ to respective valves 131, 132 mounted within the chuck body 111, and the low pressure reservoir 123 is connected by a conduit 129a and respective branch conduits 129$a_1$ and 129$a_2$ to respective valves 130, 133. The valves 130, 131, 132, 133 are simple open/shut valves having radially extending plungers which are engaged by a control ring 136 mounted on the chuck body for limited turning movement thereabout. The valves are opened by depression of the plunger, and spring biased to shut. The control ring has four recesses $136_0$, $136_1$, $136_2$, $136_3$ forming cam surfaces for operation of the four valves 130, 131, 132, 133. The four valves 130–133 are arranged diametrically opposite one another in pairs and the positions of the recesses $136_0$–$136_3$ are so arranged that opposite pairs of valves are opened or closed together. Thus, in the position shown in FIG. 7, the valves 130 and 132 are open, and the valves 131 and 133 are shut since their plungers extend into the respective recesses $136_1$, $136_3$. As will be seen from FIG. 7 the circuit is so arranged that the valves 131–133 connect one chamber of the first recess 120 in the actuator formed by the chuck body part 111 with the high pressure reservoir 122 and the other chamber with the low pressure reservoir 123, or vice versa in dependence on the position of the control ring 136. Thus, in one position of the control ring 136 the jaws are driven to open, and in the other position, that is the position shown in FIG. 7, the jaws are driven to close.

The pressure with which the jaws close depends on the pressure to which the high pressure reservoir 122 is charged by the actuation of the pumps 125, and this in turn depends on the force with which the inclination of the swash plate 126 is maintained. The force applied to the swash plate is adjustable by the adjuster 128. As the pressure in the reservoir 122 increases the back pressure in the pumps 125 increases and the spring loaded plunger 140a is forced back against the action of its biasing spring until the swash plate 126 is perpendicular to the axis of rotation 110 of the chuck body. This corresponds to the fully charged or balanced condition discussed in relation to the embodiment of FIGS. 1 to 6 and thus will not be described in greater detail here.

We claim:

1. In a power operated work holding chuck of the type having:
   a chuck body,
   radially movable jaws on the chuck body,
   fluid pressure operated actuator means,
   means linking said pressure operated actuator means to said jaws on said chuck body, whereby to transmit movement of said pressure operated actuator means to said jaws,
   the improvement wherein:
   said chuck body is formed in two parts which are secured together and rotatable with respect to one another, one of said chuck body parts housing said fluid pressure operated actuator means,
   means for mounting said one of said chuck body parts on a spindle of a machine tool,
   means defining fluid pressure reservoirs in said one of said two chuck body parts,
   a power source comprising means within said two chuck body parts for generating, as said two chuck body parts rotate with respect to one another, fluid pressure for driving said fluid pressure operated actuator means, said source acting to pump fluid from one said reservoir to the other, said fluid pressure generating means comprising a plurality of pumps operated by relative rotation of said two relatively rotatable parts of said chuck, said plurality of pumps being mounted in a circle on said one of said two chuck body parts and having operating plungers associated therewith extending axially of the chuck body,
   a swash plate carried by said one of said two chuck body parts in engagement with the free ends of said plungers of said pumps, and
   resilient biasing means on said other of said two chuck body parts, in engagement with said swash plate and resiliently biasing it to a position inclined with respect to the plane defined by the free ends of said plungers of said pumps when they are not depressed.

2. In a power operated work holding chuck of the type having:
   a chuck body,
   radially movable jaws on said chuck body,
   fluid pressure operated actuator means housed in said chuck body,
   means linking said pressure operated actuator means to said jaws on said chuck body, whereby to transmit movement of said pressure operated actuator means to said jaws,
   the improvement comprising:
   means for mounting said chuck body on a spindle of a machine tool,
   means defining fluid pressure reservoirs in said chuck body,
   a power source comprising means within said chuck body for generating, as said chuck body rotates with respect to a fixed part of the machine tool, fluid pressure for driving said fluid pressure operated actuator means, said power source acting to pump fluid from one said reservoir to the other,
   said fluid pressure generating means comprising a plurality of pumps mounted in a circle on said chuck body and having operating plungers associated therewith extending axially of said chuck body,
   a swash plate carried on said chuck body, said swash plate being so mounted that it is able to turn about any axis which lies in a plane defined by the free ends of the plungers of said pumps when they are not depressed, and resilient biasing means mountable on a fixed part of a machine tool carrying said chuck body, for engaging said swash plate and urging it to a position in which it is inclined with respect to said plane defined by said free ends of said plungers, said resilient biasing means urging said swash plate to be inclined with respect to said plane until, as the pressure delivered by said pumps increases, it lies substantially parallel to said plane defined by said free ends of said plungers.

3. In a power operated work holding chuck of the type having:
a chuck body,
radially movable jaws on said chuck body,
fluid pressure operated actuator means,
means linking said fluid pressure operated actuator means to said jaws on said chuck body, whereby to transmit movement of said fluid pressure operated actuator means to said jaws,
the improvement wherein:
said fluid pressure operated actuator means are housed in said chuck body,
means for mounting said chuck body on a spindle of a machine tool,
means defining fluid pressure reservoirs in said chuck body,
a power source comprising a plurality of pumps mounted on said chuck body, and having operating plungers associated therewith, for generating, as said chuck body rotates with respect to a fixed part of a machine tool on which a said power operated work holding chuck is mounted, fluid pressure for driving said fluid pressure operated actuator means, said pumps acting to pump fluid from one said reservoir to the other,
means for operating said plungers of said pumps sequentially upon rotation of said chuck body,
resilient biasing means urging said means for operating said plungers into contact with said operating plungers of said pumps, whereby the back pressure exerted on said plungers as said other of said two reservoirs becomes charged progressively overcomes said resilient biasing means acting on said operating means whereby the length of stroke of said plungers is progressively reduced as the pressure in said other of said reservoirs increases, the length of the stroke of said plungers being reduced to zero when said other of said reservoirs is fully charged.

4. In a power operated work holding chuck of the type having:
a chuck body,
radially movable jaws on said chuck body,
fluid pressure operated actuator means,
means linking said pressure operated actuator means to said jaws on said chuck body, whereby to transmit movement of said pressure operated actuator means to said jaws,
the improvement wherein:
said chuck body is formed in two parts which are secured together and rotatable with respect to one another, one of said chuck body parts housing said fluid pressure operated actuator means,
means for mounting one of said chuck body parts on a spindle of a machine tool,
means defining at least two fluid pressure reservoirs in one of said two chuck body parts,
a power source comprising a plurality of pumps mounted on one of said two relatively rotatable chuck body parts, and having operating plungers associated therewith, for generating, as said two chuck body parts rotate with respect to one another, fluid pressure for driving said fluid pressure operated actuator means, said pumps acting to pump fluid from one said reservoir to the other,
means for operating on said plungers of said pumps upon relative rotation of said two chuck body parts for causing said pumps to operate as said two chuck body parts rotate with respect to one another,
resilient biasing means urging said means for operating said plungers into contact with said plungers whereby to cause said plungers to be operated upon relative rotation of said two chuck body parts when the back pressure exerted on said plungers by the pressure in said other of said reservoirs is less than the force exerted by said resilient biasing means, the length of stroke of said plungers being progressively reduced as the pressure in said other of said reservoirs increases, and being reduced to zero when said other of said reservoirs is fully charged and the back pressure exerted thereby is not less than the force exerted by said resilient biasing means.

5. The power operated work holding chuck of claim 3 wherein said means for operating said plungers of said pumps is a swash plate mounted on said chuck body, and said resilient biasing means urging said swash plate into contact with said operating plungers of said pumps is adapted to be mounted on a fixed part of the machine tool on which said chuck is mounted.

6. A power operated work holding chuck as in claim 4 wherein said means for operating said plungers of said pumps upon relative rotation of said two chuck body parts comprises a swash plate mounted on said one of said two chuck body parts, and said resilient biasing means urging said swash plate into contact with said operating plungers of said pumps is mounted on said other of said two chuck body parts.

7. The power operated chuck of claim 5, wherein there are provided adjuster means for varying the force applied by said resilient biasing means to maintain the inclination of said swash plate with respect to the axis of rotation of said chuck.

8. The power operated chuck of claim 6, wherein there are provided adjuster means for varying the force applied by said resilient biasing means to maintain the inclination of said swash plate with respect to the axis of rotation of said chuck.

9. The power operated chuck of claim 1 wherein there are further provided means defining a resiliently deformable chamber within said chuck body, and means connecting said resiliently deformable chamber with one of said first and second reservoirs, whereby said resiliently deformable chamber acts as an auxiliary reservoir to accommodate transient changes in pressure as said jaws of said chuck are operated.

10. The power operated chuck of claim 2 wherein there are further provided means defining a resiliently deformable chamber within said chuck body, and means connecting said resiliently deformable chamber with one of said first and second reservoirs, whereby said resiliently deformable chamber acts as an auxiliary reservoir to accommodate transient changes in pressure as said jaws of said chuck are operated.

* * * * *